UNITED STATES PATENT OFFICE.

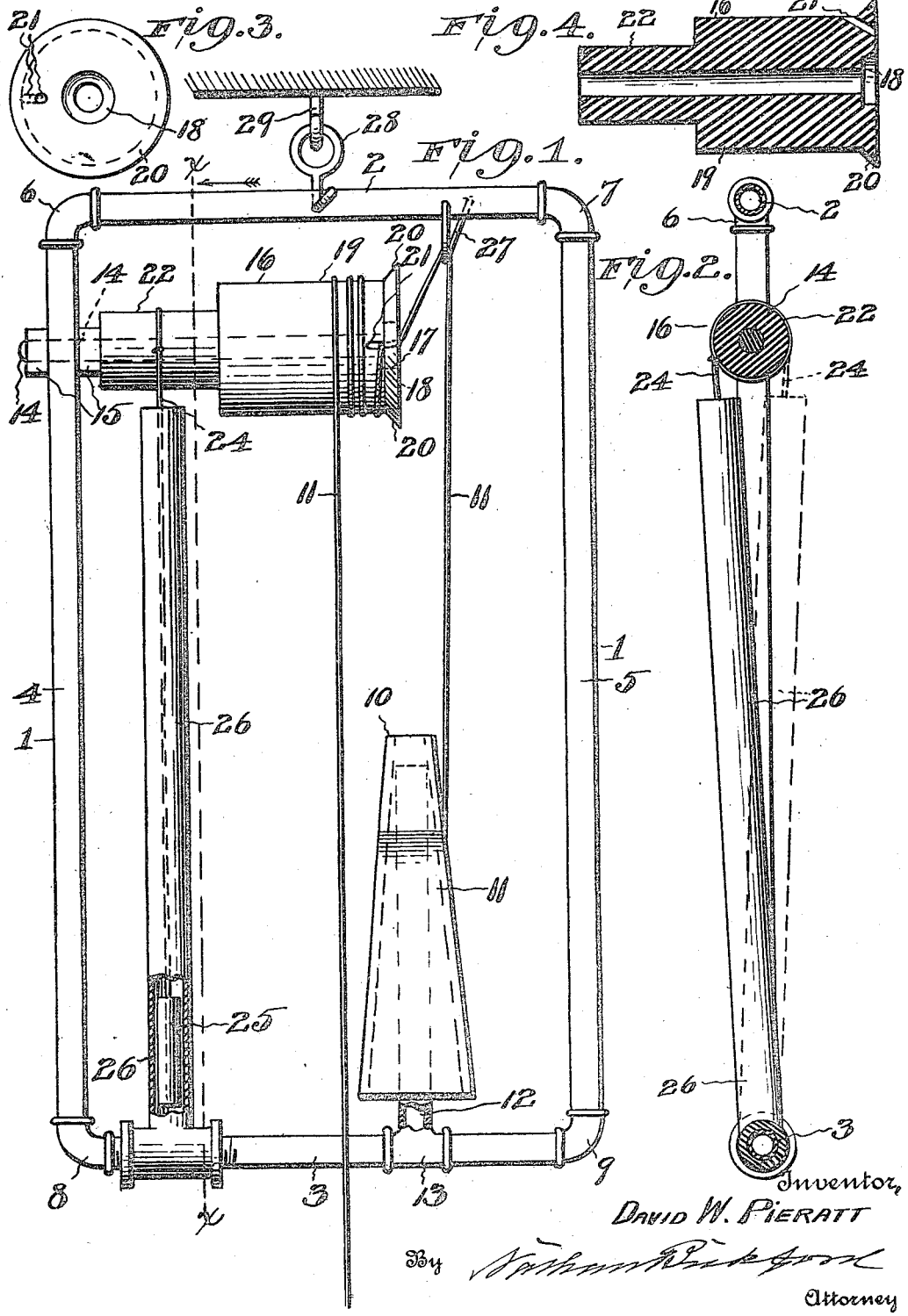

DAVID W. PIERATT, OF GATE, OKLAHOMA.

TWINE-HOLDER.

1,257,112. Specification of Letters Patent. Patented Feb. 19, 1918.

Application filed April 9, 1917. Serial No. 160,760.

*To all whom it may concern:*

Be it known that I, DAVID W. PIERATT, a citizen of the United States, residing at Gate, in the county of Beaver, State of Oklahoma, have invented certain new and useful Improvements in Twine-Holders; and I do declare the following to be a full, clear, and exact description of the invention, such as will enable others skilled in the art to which it pertains to make and use the same.

My invention relates to an improvement in twine holders.

The object of the invention is to provide a twine holder suitable for use in stores and any other place or places desired particularly adapted to be secured or suspended from the ceiling above a counter, table or other article.

A further object is to provide a twine holder which will leave the end of the twine on being severed after being used to wrap a bundle, box or other article at such a height above the counter, table or other article that it will be within easy and convenient reach of the salesman.

A further object is to provide a twine holder which will automatically wind up a portion of the twine that has been drawn off the reel and keep the loose end of the same up out of the way at all times.

A further object is to provide a twine holder, operated by means of a weight, with a pivoted tubular weight holder or receptacle for the purpose of allowing the weight holder to be adjusted in order to prevent the cord on which the weight is suspended from binding on the weight, receptacle or holder.

A further object is to provide a twine holder, which may be used equally as well for holding thread, cord, string, etc. as for holding twine.

A further object is to provide means in connection with the reel for pulling the twine off the twine supply cone.

A still further object is to provide a twine holder which is simple, inexpensive and durable in construction and easy and very effective in operation.

The invention consists in the several features and in the construction, combination and arrangement of features as more fully hereinafter described and claimed.

Referring to the drawings:—

Figure 1 is a front elevation of my invention shown suspended from a ceiling ready for use, with parts broken away.

Fig. 2 is a vertical section taken on the line *x—x* of Fig. 1.

Fig. 3 is an end elevation of the reel.

Fig. 4 is a central longitudinal section of the reel.

In the drawings in which similar reference character denote similar parts throughout the several views, 1 represents the frame of the twine holder which comprises four preferably tubular parts 2, 3, 4, and 5 secured or joined together by means of tubular elbows 6, 7, 8, and 9.

A twine supply cone 10 is provided having twine 11 wound thereon and mounted on an upwardly projecting tubular pipe 12 which is secured in a T coupling 13 mounted on the tubular part 3.

Near the upper end of the part 4 a shaft 14 is secured therethrough and clamped and held securely in place by means of nuts 15. A twine reel 16 is rotatably mounted on the shaft 14 and held thereon by means of a nut 17 which is seated in a recess 18 in the end of the reel.

The reel is provided with a twine receiving portion 19 having a flange 20 with an inclined hole or aperture 21 extending through the flange, the hole 21 being for the purpose of holding the twine momentarily as the reel is revolved, causing the twine to be unwound from the supply cone and also to retain the twine on the reel.

The reel is also provided with a reduced portion 22 having one end of a cord 24 secured thereto while the opposite end of the cord is provided with a weight 25.

The withdrawing of the twine causes the reel to rotate in one direction and winds the cord 24 on the reduced portion 22, and on the release of the end of the twine 11 the weight 25 causes the cord 24, on the reduced portion, to be unwound therefrom and thereby rotates the reel in the opposite direction.

A tubular receptacle or tube 26 is pivotally mounted on the part 3 of the frame and is adapted to contain the weight 25.

Pivoting the tubular receptacle 26 on the part 3 renders it capable of being adjusted, either backward or forward, to keep it in alinement at all times and prevents the cord 24 carrying the weight 25 from being severed by rubbing on the edge of the tubular receptacle or binding on the same to such an extent that the operation of the cord and weight is retarded which in turn retards the free operation of the reel.

The part 2 of the frame is provided with a pivoted twine guide 27 which holds and presents the twine to the reel at the proper angle.

The frame of the twine holder is adapted to be suspended by means of a loop 28 pivoted to the part 2 of the frame and 29 represents a hook depending from the ceiling on which the loop is adapted to be hung. Although I have described the frame as tubular it may be made of solid parts equally as well.

In operation the tubular receptacle is adjusted, either backward or forward, so as to be in alinement with the cord 24, the loose or free end of the twine 11 is grasped and pulled downward which causes the reel to rotate in a forward direction and pulls or draws the twine from the supply cone through the inclined hole or aperture 21 and causes the cord 24 to wind up on the reduced portion 22 and the weight 25 to be moved upward in the tubular receptacle or tube 26. Then after the bundle or other article has been tied up the twine is released and the weight causes the cord to be unwound and the reel to rotate in a backward, or opposite, direction until the free or severed end of the twine is at the proper height to be reached for the next operation.

I do not desire to be understood as limiting myself to the specific details of construction and arrangements as herein described and illustrated, as it is manifest that variations and modifications may be made in the features of the construction and arrangement in the adaptation of the device to various conditions of use without departing from the spirit and scope of my invention and improvements. I therefore reserve the right to all such variations and modifications as properly fall within the scope of my invention and the terms of the following claims.

What I claim is:—

1. In a twine holder, a frame, a reel mounted thereon having a twine receiving portion and a reduced portion, an upwardly extending tube pivoted to said frame and having its upper and free, means for rotating said reel in one direction in serving the twine, means for rotating the reel in the opposite direction for taking up the severed end of the twine, comprising flexible means attached to said reel and a weight attached to said flexible means mounted and slidable in said upwardly extending pivoted tube.

2. In a twine holder, a frame, a reel mounted thereon having a twine receiving portion and a reduced portion, an upwardly extending tube adapted to receive a slidable weight and having its lower end pivoted to said frame and its upper end free, means for rotating the reel in one direction operatively connected to said reel and weight and means for rotating the reel in the opposite direction.

3. In a twine holder, a frame having an upwardly extending pivoted tube, a shaft secured in said frame above said pivoted tube, a reel mounted on said shaft having a twine receiving portion, a flange with an inclined hole or aperture and a reduced portion, a weight secured to flexible means and mounted in said pivoted tube.

4. In a twine holder, a frame comprising tubular parts, the lower tubular part provided with an upwardly extended pivoted tube, a shaft secured in one of the side tubular parts, a reel mounted on said shaft having a twine receiving portion, and means for drawing the twine from the twine supply and, a reduced portion, flexible means attached to said reduced portion and a weight secured to said flexible means and mounted in said upwardly extending tube.

5. In a twine holder, a frame, a shaft secured in said frame, a reel mounted on said shaft having a recess at one end adapted for the reception of the means for securing the reel to the shaft, a twine receiving portion having a flange provided with an inclined hole or aperture, a reduced portion, flexible means attached to said reduced portion, a weight secured to said flexible means and a pivoted tube in which said weight is mounted.

6. In a twine holder, a frame, a reel having a twine receiving portion with an inclined tubular opening adapted for the passage of twine, a reduced portion, flexible means connected to said reduced portion, a weight secured to said flexible means, a tube in which said weight is mounted and means for keeping the flexible means in alinement with the said tube.

7. In a twine holder, a frame, having a pivoted twine guide, a pivoted upwardly extending tube, a twine supply, a shaft, a reel mounted on said shaft provided with an inclined opening adapted for the passage and intermittent retarding of twine, a twine receiving portion, flexible means attached to said reduced portion and a weight secured to said flexible means and mounted in said upwardly extending tube.

DAVID W. PIERATT.

Copies of this patent may be obtained for five cents each, by addressing the "Commissioner of Patents, Washington, D. C."